US006947537B2

(12) United States Patent
Pershan

(10) Patent No.: US 6,947,537 B2
(45) Date of Patent: Sep. 20, 2005

(54) METHODS AND APPARATUS FOR USING AIN TECHNIQUES TO FACILITATE SERVICING OF CALLS BY A GROUP OF USERS

(75) Inventor: Barry Paul Pershan, Olney, MD (US)

(73) Assignee: Verizon Services Corp., Silver Spring, MD (US)

( * ) Notice: Subject to any disclaimer, the term of this patent is extended or adjusted under 35 U.S.C. 154(b) by 513 days.

(21) Appl. No.: 09/812,487

(22) Filed: Mar. 20, 2001

(65) Prior Publication Data

US 2002/0034289 A1 Mar. 21, 2002

Related U.S. Application Data

(60) Provisional application No. 60/233,313, filed on Sep. 15, 2000.

(51) Int. Cl.[7] ............................................... H04M 3/42
(52) U.S. Cl. .......................... 379/207.02; 379/221.09; 379/265.09
(58) Field of Search ....................... 379/207.02, 207.04, 379/207.05, 207.12, 210.01, 211.01, 211.02, 212.01, 213.01, 221.08, 221.09, 265.09, 88.17, 900

(56) References Cited

U.S. PATENT DOCUMENTS

| | | | | | |
|---|---|---|---|---|---|
| 5,206,901 | A | * | 4/1993 | Harlow et al. | 379/211.04 |
| 5,550,907 | A | * | 8/1996 | Carlsen | 379/211.02 |
| 5,583,564 | A | * | 12/1996 | Rao et al. | 348/14.01 |
| 6,366,661 | B1 | * | 4/2002 | Devillier et al. | 379/211.01 |

* cited by examiner

Primary Examiner—Bing Q. Bui
(74) Attorney, Agent, or Firm—Straub & Pokotylo; Michael P. Straub

(57) ABSTRACT

AIN based call routing, transfer and conferencing methods and apparatus are disclosed. In various embodiments initial call routing is based on the availability of a party to service a call as determined from a computer system associated with the party selected to service the call. The party's computer system supports a telephone application programming interface (TAPI) which allows a telephone network server to determine the availability of the party selected to service the call from, in part, TAPI obtained telephone line status information. The network server supplies call related data to the computer system of the party assigned to service the call. Call transfer and conferencing operations along with the transfer of call related data are also supported. AIN mid-call triggers are used in some embodiments to support call transfer and conferencing operations.

24 Claims, 6 Drawing Sheets

METHODS AND APPARATUS FOR USING AIN TECHNIQUES TO FACILITATE SERVICING OF CALLS BY A GROUP OF USERS

RELATED APPLICATION

The present application claims the benefit of U.S. Provisional Application Ser. No. 60/233,313 filed Sep. 15, 2000.

FIELD OF THE INVENTION

The present invention is directed to communications systems and, more particularly, to methods and apparatus for providing call routing, call transfer and call conferencing operations.

BACKGROUND OF THE INVENTION

Telephone service users, e.g., sales people, businesses, and even individuals, have come to rely on the ability of the public switched telephone network (PSTN) to provide a host of voice services including telephone conferencing, call transfer, voice mail, etc. As computers and the Internet continue to grow in importance, people using telephones are becoming ever more dependent on their computers to provide and/or enter relevant information needed to service a telephone call. Examples of cases where computer access is important to servicing a telephone call include, e.g., providing product information, entering a telephone order for merchandise, etc. During conference calls it is frequently helpful if conference call participants can share information on their computers while engaged in discussions over the telephone.

Until recently, telephone companies focused primarily on providing voice services to customers. With the advent of the computer age and the ever increasing demand for the ability to display and enter information using a computer, the need for integrated voice and data services is becoming ever more apparent.

In order to provide enhanced telephone services, many telephone companies now implement a telephone communications network as an Advanced Intelligent Network (AIN) which has made it easier to provide a wide array of previously unavailable telephone services. In an AIN system, telephone central offices, each of which serves as a signal switching point (SSP), detect one of a number of call processing events identified as AIN "triggers". An SSP which detects a trigger suspends processing of the call which activated the trigger, compiles a call data message and forwards that message via a common channel interoffice signaling (CCIS), utilizing the Signal System 7(SS-7) protocol, link to a database system, such as a Service Control Point (SCP). The SCP may be implemented as part of an integrated service control point (ISCP). If needed, the SCP can instruct the central office SSP at which the AIN trigger was activated to obtain and forward additional information, e.g., information relating to the call. Once sufficient information about the call has reached the ISCP, the ISCP accesses stored call processing information or records (CPRs) to generate from the received message data, a call control message. The call control message is then used to instruct the central office on how to process the call which activated the AIN trigger. As part of the call control message, an ISCP can instruct the central office to send the call to an outside resource, such as an intelligent peripheral (IP) using a send to outside resource (STOR) instruction. IPs are frequently coupled to SSPs to provide message announcement capabilities, voice recognition capabilities and other functionality which is not normally provided by the central office. The control message is normally communicated from the ISCP to the SSP handling the call via the CCIS/SS-7 link. Once received, the SCP completes the call in accordance with the instructions received in the control message.

One service which can be enhanced with the use of AIN functionality is Centrex. Centrex takes a group of normal telephone lines and provides call processing to add business features to the otherwise standard telephone lines. For example, Centrex adds intercom capabilities to the lines of a specified business group so that a business customer can dial other stations within the same group, e.g., lines belong to the same company, using extension numbers such as a two, three, or four digit numbers, instead of the full telephone number associated with each called line. Other examples of Centrex service features include call transfer between users at different stations of a business group, and a number of varieties of call forwarding. Thus, Centrex adds a bundle of business features on top of standard telephone line features without requiring special equipment, e.g., a private branch exchange (PBX) at the customer's premises. U.S. Pat. No. 5,247,571, which is hereby expressly incorporated by reference, describes in detail a Wide Area Centrex system implemented using AIN techniques.

In order to make it easier to manage various Centrex services, e.g., call forwarding services, it has been suggested that users of Centrex services be allowed to manage various service features from their computers via the Internet. U.S. Pat. No. 5,958,016 discusses the use of a server accessible via the Internet, to allow users limited control of AIN based telephone services from their computers.

While AIN systems are beginning to take advantage of computers and Internet Protocol (IP) network access to the telephone system for making management of telephone services easier, the ability of an AIN network to provide new services by interacting with subscriber's computers and/or computer network has generally gone overlooked.

To facilitate telephone system and computer system interaction, a TAPI (telephone application programming interface) has begun to be supported by Microsoft Corporation and other computer software providers. TAPI is intended for use by computer systems which are coupled to a telephone device thereby allowing the computer system to receive signals from, and send signals to, the attached telephone device. Using TAPI, a computer system user can initiate telephone operations by activating icons on his/her computer screen and/or entering relevant information such as the telephone number to be dialed. Modern TAPI applications frequently focus on enhancing customer premise equipment to merge computer and telephony functions normally provided by separate telephone and computer devices at the customer's premise into a single computer/telephony device.

In view of the above discussion, it should be apparent that a host of new telephony/computer services based on the integration of voice and computer services is desirable. Rather than simply focus on computer/telephony enhancements to customer premise equipment, new network based services which provide integrated computer/telephony features are desirable.

For example, in many cases, it would be desirable to perform network based call routing or call distribution operations based on information available from the computer systems associated with individuals to whom a call might be routed by the telephone network. It would also be desirable if the telephone network could populate the computer screen of an individual with information relevant to servicing the call before or as the call is being routed to the individual. It would also be desirable if call related information could be automatically transferred and/or shared between computers as a call is transferred or conferenced.

SUMMARY OF THE INVENTION

The present invention is directed to methods and apparatus for providing call routing, call transfer and call conferencing operations using Advanced Intelligent Network (AIN) capabilities and various levels of computer/telephony integration.

Various embodiments are directed to methods and apparatus for providing network services, e.g., advanced Centrex services, that utilize AIN capabilities of a telephone system including, e.g., a network server, end user computers and telephones, service control points, e.g., an integrated service control point (ISCP), and digital telephone switches. One or more intelligent peripherals (IPs), e.g., interactive voice response peripherals (IVR IPs) may also be used.

In accordance with the present invention incoming telephone call and/or caller information is passed to a network server included in the telephone network. The network server is connected to an end-user's computer desktop via a network or Internet connection. The network server, under software control, identifies and selects a user, e.g., service representative or telephone operator, to receive an incoming call based on, e.g., the user's availability, skills, and/or other call related information. The network server instructs the AIN ISCP to route the call to a specific communications station, e.g., by sending the ISCP the telephone number of the station to which the call is to be directed. Each communications station may include, e.g., a telephone and a computer equipped for use by an operator or sales representative.

In various embodiments, as the ISCP causes the incoming call to be routed to the station selected by the network server, the network server populates the end-user's, e.g., service representative's, computer screen with pertinent data specific to the incoming call. The user, e.g., first user, to whom the call is directed may redirect, e.g., transfer, the call to another user (e.g., second user) or initiate a conference call between the calling party and the second user.

The call transfer and conference calling features of the present invention can be activated via the user's computer system and a TAPI interface or, alternatively through a switch hook flash, sometimes called a hook flash for short. In various embodiments, the hook flash activates an AIN trigger, e.g., a mid call trigger, set on the user's line. AIN triggers which are activated by a switch hook flash are sometimes called hook flash triggers. Table 4-1 of Bellcore document GR-1298-CORE (Issue 4, September 1997 w/revision 1, October 1998) lists several AIN hook flash triggers. As a result of activation of the hook flash mid-call trigger, the ISCP, in accordance with the present invention, is contacted by the user's switch and a transfer or conference call operation is initiated under control of the ISCP. A second hook flash is used to activate the mid-call trigger for a second time causing the ISCP to complete the call transfer operation or conference call operation.

While numerous features of the present invention are described in the following pages, in the context of an exemplary Centrex embodiment it is to be understood that the features of the present invention are not necessarily limited to a Centrex embodiment and that many features including the use of mid-call triggers for call transfer and conferencing operations can be used in non-Centrex applications and embodiments.

Various additional features and advantages of the present invention will be apparent from the detailed description which follows.

BRIEF DESCRIPTION OF THE DRAWINGS

FIG. 3, which comprises the combination of

DETAILED DESCRIPTION

As discussed above, the present invention is directed to methods and apparatus for servicing calls by performing call routing, call transfer and call conferencing operations. As part of servicing a call, call related information or data, under direction of a network server, is provided to or shared between computers used by parties servicing a call. The telephone/computer services of the present invention may be provided as stand-alone services, as part of a Centrex service, or as part of another telephone service package.

Figure 1:
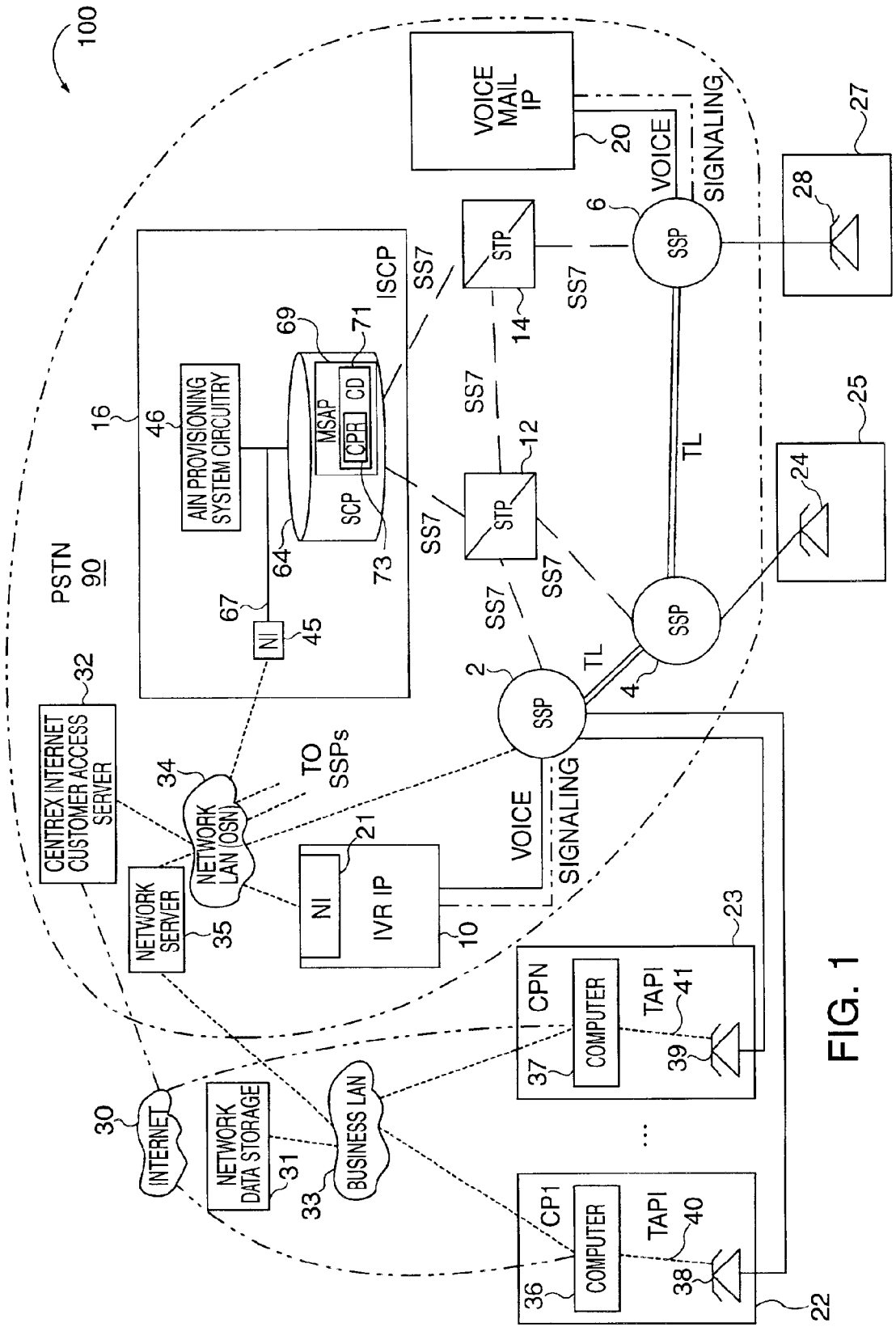
FIG. 1 illustrates a communication system implemented in accordance with an exemplary embodiment of the present invention.

FIG. 1 illustrates a communication system 100 implemented in accordance with an exemplary embodiment of the present invention. The system 100 supports communications via the Internet 30, as well as a public switched telephone network (PSTN) 90. The PSTN 90 includes a plurality of signal switching points (SSPs) 2, 4, 6, a plurality of signal transfer points (STPs) 12, 14, an integrated service control point (ISCP) 16, a Centrex Internet customer access server 32, an interactive voice response IP 10, and a Voice mail IP 20. The PSTN 90, in accordance with the present invention, also includes a local area network 34 and a network server 35.

The SSPs 2, 4, 6 may be implemented using known Class V telecommunications switches capable of supporting the Signaling System seven (SS7) protocol. Each SSP 2, 4, 6 may correspond to a different telephone central office. Trunk lines (TL), which may be implemented using fiber optic cables, interconnect the various SSPs 2, 4, 6.

Each SSP 2, 4, 6 is normally connected to one or more customer premises (CPs) which may include, e.g., Centrex subscriber residences and/or offices as well as the residences and offices of non-Centrex subscribers. In the FIG. 1 example, first and second customer premises 22 and 23 are coupled to SSP 2. Additional customer premises 25, 27 include telephones 24, 28, respectively. Telephone 24, which is coupled to SSP 4, and telephone 28, which is coupled to SSP 6, are located at additional customer premises 25, 27. Connections between the SSPs and CPs may be by POTS lines, ISDN lines, DSL, or other known communications lines.

Communications equipment, referred to as customer premise equipment (CPE) is located at each customer premises 22, 23, 25, 27. Customer premise equipment may include, e.g., telephones, faxes, computers, etc. In FIG. 1, a computer 36, and land-line telephone 38 are shown as being located at the first customer premises 22. As will be discussed below, each of these devices corresponds in the exemplary embodiment shown in FIG. 1 to a first Centrex service subscriber. The computer 36, located at the first customer premises 22 is coupled by any one of a plurality of known connection techniques, e.g., telephone dial-up, ISDN, DSL, etc., to the Internet 30, also known as the World Wide Web. The computer 36 is also coupled to a local network, e.g. business LAN 33. The computer 36 and telephone 38 are coupled together by a communications link 40 which supports the known TAPI interface. Via TAPI, the computer 36 can initiate various telephone operations and receive voice calls via SSP 2 and telephone 38.

The computer 37 and telephone 39 located at the Nth customer premises 23 are coupled together by communications link 41 in the same manner that computer 36 and telephone 38 are coupled together. In addition, computer 37 is coupled to business LAN 33 and the Internet 30.

Computers 36, 37 can receive and transmit data using the business LAN 33. Thus, customer information may be supplied to computers 36, 37 at the direction of network server 35 which is also coupled to LAN 33. Information supplied to a called party's computer may be forwarded from network data storage device 31, from storage included in the network server 35, or from another data storage location which can be accessed under direction of network server 35 and/or computers 36, 37.

While the third and fourth customer premises 25, 27 are illustrated as including only landline phones, it is to be understood that they may have any number of communications devices including, e.g., telephone, fax, and computer devices. For purposes of explanation, it will be assumed that the first customer premises 22 corresponds to a first Centrex service subscriber while the second customer premises 23 corresponds to a second Centrex service subscriber. Additional Centrex service subscribers may be coupled to any one of the SSPs 2, 4, 6.

The system 100 is implemented using AIN techniques. Accordingly, the processing of calls directed to a customer's telephone line and received by an SSP from a telephone customer's line may be controlled by instructions included in customer call processing records (CPRs). In the system 100, the CPRs are stored at the Integrated Services Control Point (ISCP) 16. At least one CPR exists for each Centrex service subscriber. A customer's CPR is accessed in response to activation of an AIN trigger set at, e.g., the SSP 2, 4, or 6 to which the telephone line or lines to the subscriber's customer premises are connected.

The ISCP 16 includes an SCP 64, an AIN provisioning system 46 and a network interface (NI) 45. A local network 67 couples the various components of the ISCP 16 together.

The network interface 45 couples the ISCP 16 to various other components of the telephone network 100 via a TCP/IP based network referred to as an operational services network (OSN) 34. The OSN 34 connects the Centrex Internet Customer Access Server 32, network server 35, SSPs 2, 4, 6, Intelligent Peripherals (IPs) 10, 20, and the ISCP 16 together. Thus, the OSN 34 is a network over which control and signaling information can be passed between the various telephone network system components, e.g., using TCP/IP. Significantly, OSN 34 allows for interaction between the ISCP and network server 35 used to provide various route selection and data forwarding features of the present invention. The network server 35 is coupled to the business LAN 33 and serves as a bridge between telephone network components and external devices such as business LAN 33 over which data and control signals can pass.

In addition to being connected to the OSN 34, ISCP 16 is connected, via its SCP 64, to the SSPs via one or more signal transfer points (STPs) 12, 14 and Signaling System Seven (SS7) interconnects over which messages, data, and requests for call processing control instructions can be communicated between the SSPs 2, 4, 6, and ISCP 16.

The SCP 64 includes a multi-service application platform (MSAP) database 69 which includes customer data (CD) 71 for each of a plurality of Centrex and/or other service subscribers. The customer data 71 includes, for each customer: 1) a list of the services to which the customer subscribes; 2) a password which may be input via DTMF signals; and 3) a call processing record (CPR) which is used to instruct an SSP how to process a call in response to an AIN trigger to thereby implement the services to which the customer subscribes. Exemplary services which may be supported by the ISCP 16 include, e.g., call routing, call transfer, conference calling, call forwarding, call screening, voice dialing, voice mail and a host of other services which may be provided to Centrex subscribers as well as non-Centrex telephone customers.

For purposes of explaining the call routing, transfer and conferencing features of the present invention, the services will be described in the context of a Centrex environment. However, it is to be understood that the services of the present invention can be provided outside the Centrex environment, e.g., call routing, call transfer and call conferencing services can be provided to non-Centrex telephone customers as well as Centrex service subscribers.

The customer data 71 which includes call processing records 73 is generated, at least initially, by the AIN provisioning system 46 in response to input received from a service representative or operator. Customer data in the database 71 may, after initial provisioning of a service for a customer, be updated by the customer via the Internet and the use of a Web browser by way of the Centrex ICAS server 32 which can access and modify the contents of the customer data 71.

Among other things, the AIN provisioning system circuitry 46 is responsible for setting and/or updating AIN triggers, including mid-call triggers, at the various signal switching points (SSPs) required to implement AIN based services to the subscribers. In addition to setting AIN triggers, the AIN provisioning system circuitry 46 is responsible for generating and/or updating customer data, e.g., call processing records 73, and other information stored in various locations in the system 100, as required to implement a service order. As will be discussed below, various IPs 10, 20 are used to provide services to Centrex and other telephone service subscribers. Thus, in addition to updating information in the customer database 71, the AIN provisioning system circuitry 46 is responsible for updating information in the various IPs 10 and 20. The updating of the IPs and the setting of AIN triggers can be performed by the AIN provisioning system circuitry 46 through communications with the various system components conducted using the OSN 34 and/or via SS7 links to the ISCP 16.

Once service to a customer has been initially configured, a Centrex service subscriber can, in accordance with the present invention, update various service information though the use of a personal computer and a Web Browser application, various known browsers include Internet Explorer and Netscape. In the FIG. 1 system, the service subscriber to whom the first customer premises 22 corresponds can update the subscriber's Centrex information via the use of computer 36 and an Internet connection.

The ICAS 32 serves as a secure gateway via which Centrex subscribers can update and configure their Centrex telephone service information using a computer coupled to the Internet. The ICAS 32 includes security routines, e.g., a firewall, designed to prevent individuals other than the subscriber gaining access to and/or modifying via the Internet, subscriber service information. The ICAS 32 is coupled to the OSN 34 thereby allowing a customer, upon satisfying various security checks, to access and modify service information stored in any one of the various network devices, e.g. ISCP 16, and/or IP 10, 20, coupled to the OSN 34.

In order to implement various services, such as voice dialing and telephone access to Centrex customer service information, IPs 10, 20 are used. The first IP 10 is an interactive voice response (IVR) IP which is capable of performing speech recognition and DTMF signal detection operations, as well as playing voice prompts and other messages to Centrex customers.

IVR IP 10 is coupled to the first SSP 2 via audio (voice) and signaling lines. It is also coupled to the OSN through a network interface (NI) 21. In this manner, the IVR IP 10 can interact with other components of the system 100, e.g., ISCP 16, via communications transmitted over OSN 34 or through the SSP 2. The IVR IP 10 may be implemented using known hardware. Accordingly, the hardware used to implement IVR IP 10 will not be described in detail.

The IVR IP 10 serves as a platform by which a Centrex service subscriber can update his/her service information, e.g., voice dialing directory information, through a telephone as opposed to an Internet connection. A Centrex service subscriber can establish a service updating or management session with the IVR IP 10, by dialing a telephone number associated with the IVR IP 10. Dialing of the IVR IP's telephone number results in the subscriber's call being routed to SSP 2 and a voice/DTMF connection to the IVR IP 10 being established.

IVR 10 includes various security features, e.g., customer identification and password entry requirements, as does the ICAS 32, to insure that Centrex customers are limited to accessing and updating their own service records and not those of other Centrex service subscribers.

Voice mail IP 20, coupled to SSP 6, can be used to provide voice mail services to Centrex as well as non-Centrex voice mail subscribers.

As mentioned above, network server 35 interacts with the SCP 69 and other PSTN 90 components to perform call routing, e.g., automated call distribution, call transfer, and call conferencing functions.

Figure 2:
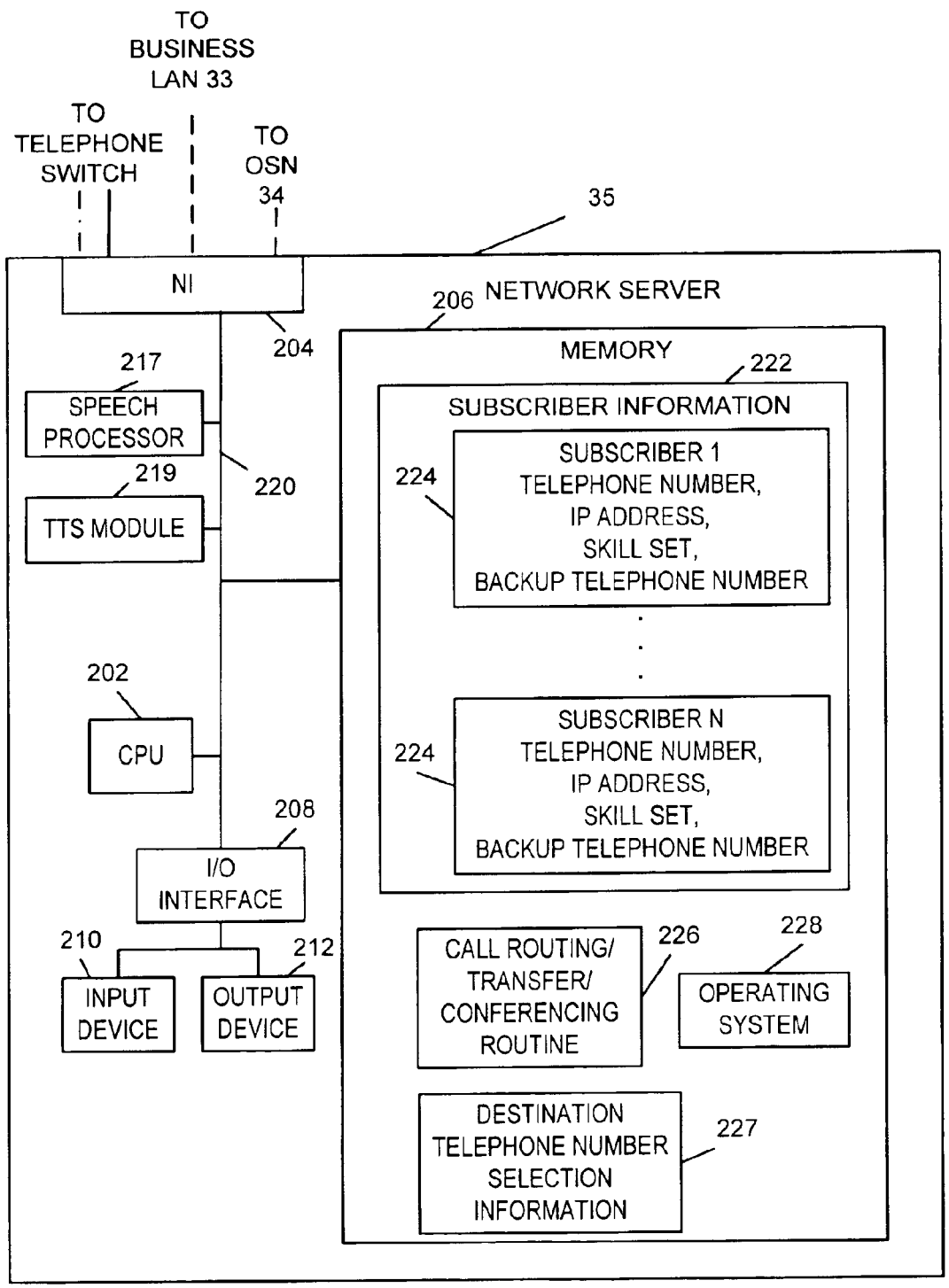
FIG. 2 illustrates a network server implemented in accordance with the present invention, which can be used as the network server shown in FIG. 1.

FIG. 2 illustrates an exemplary network server 35. The network server 35 includes input/output (I/O) interface 208, network interface 204, memory 206 and central processing unit (CPU) 202, which are coupled together by bus 220. I/O interface 208 is coupled to an input device 210, e.g., keyboard, and an output device 212, e.g., display. Using input and output devices 210, 212 a local system administrator can control network server operation, e.g., for system maintenance. Network interface 204 couples the server 35 to the business LAN 33 and the OSN 34 allowing the server 35 to receive and send messages to and from devices coupled to the networks such as the ISCP 16 and the subscriber's computers 36, 37. In addition, subscriber information as well as other information can be retrieved from and loaded into the network server 35, e.g., by the ICAS 32 or SCP 64 via the network interface 204.

The memory 206 includes a set of subscriber information 222, a call routing/transfer/conferencing routine 226 and an operating system 228. The set 222 of subscriber information includes, for each of a first through Nth service subscriber, a record of subscriber information 224, 224'. Each subscriber record 324, 224' includes a subscriber identifier, the subscriber's telephone number, the IP address of the subscriber's computer, information about the subscriber's skills and/or services the subscriber is responsible for providing to telephone calling parties and, optionally, a backup telephone number corresponding to another individual who may be assigned to service a call in the event that the subscriber is unavailable to take an incoming call.

The CPU 202 controls operation of the network server 35 under control of an operating system 228 and call routing/transfer/conferencing routine 226 stored in memory 206. Routine 226 includes a plurality of computer instructions for controlling various telephone service operations. Under control of the routine 226 the CPU 202 controls the network server 35 to interact with various other system components including the ISCP 16 and business LAN 33. Operations performed by the server 35 will be discussed further in regard to the flow charts of FIGS. 3–5.

Figure 3A:
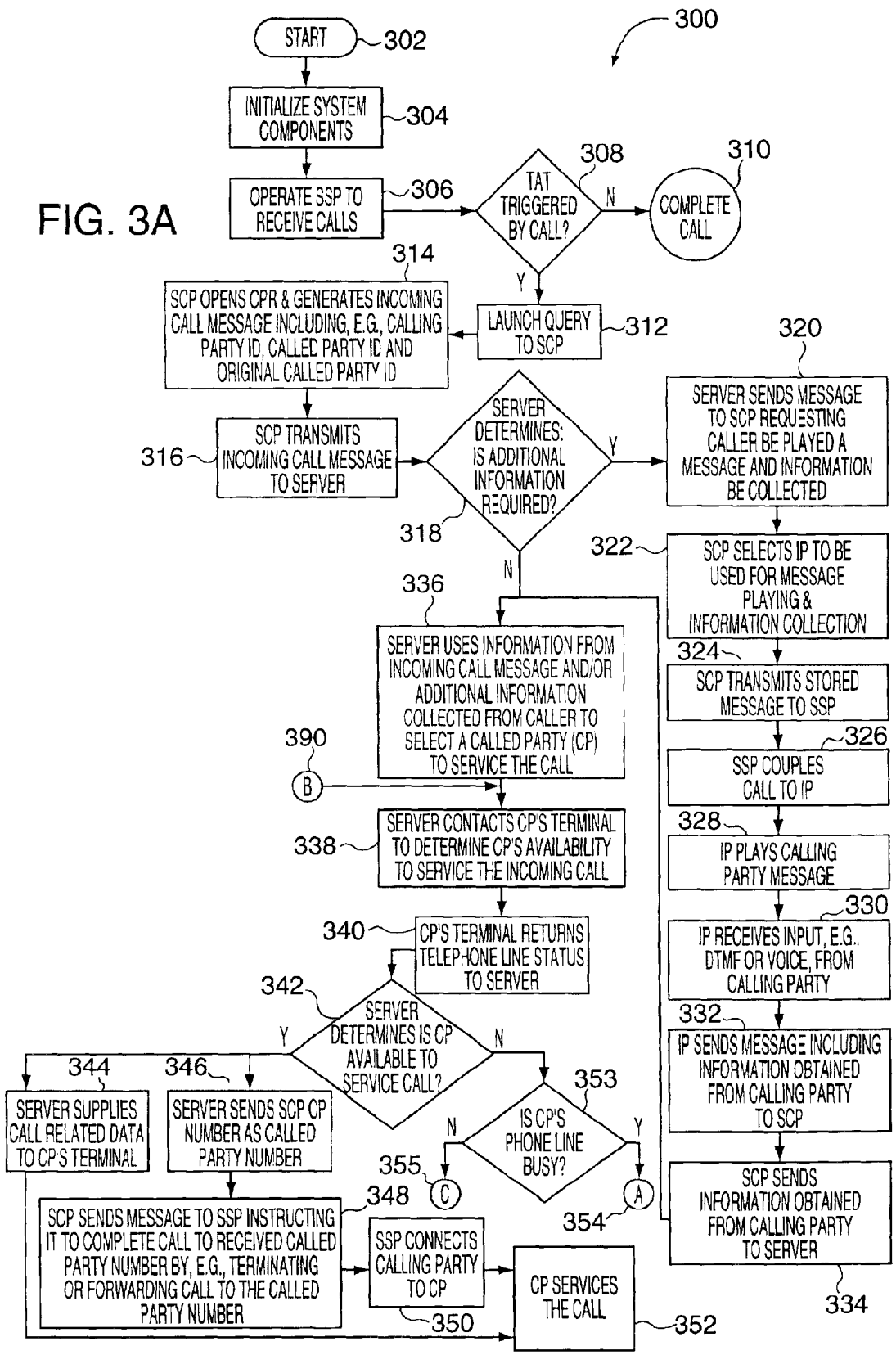
FIGS. 3A and 3B, illustrates a network based call routing and processing operation which integrates computer and telephony services.
Figure 3B:
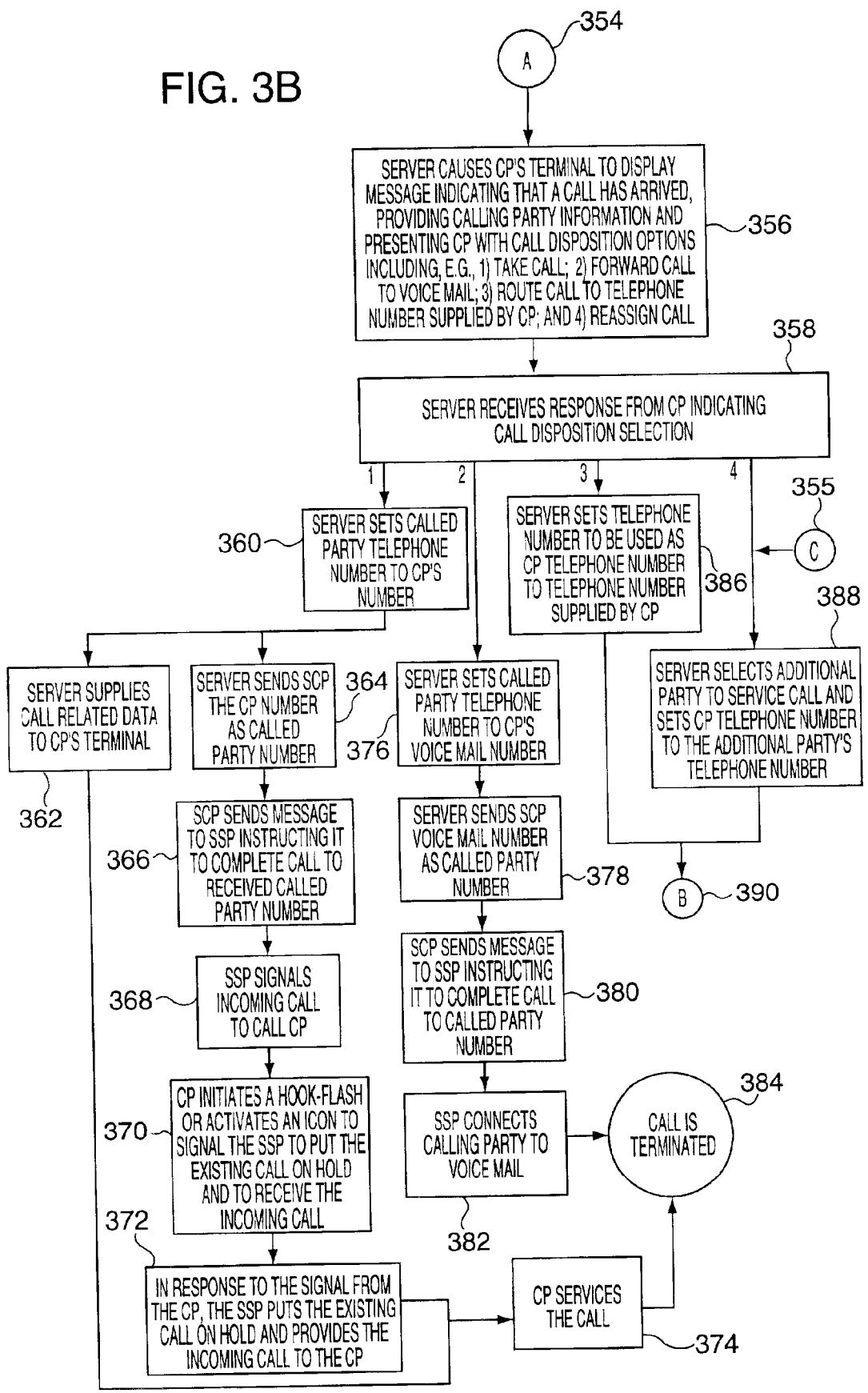

FIG. 3 illustrates the routing, e.g., automated call distribution method, of the present invention. The method starts in step 302. Then, in step 304 the components of system 100 are initialized. At this point in time, TAT triggers have been set on subscriber's lines as part of the previous provisioning of the call routing, transfer and conferencing services of the present invention. A line on which a TAT trigger is set may be the line of an individual, e.g., customer server representative. Alternatively, the line can be a central business line which requires the incoming call to be routed to anyone of a plurality of operators capable of servicing a call. As will be discussed below, the network server can be used to determine the ultimate destination telephone number to which a call is routed.

After initialization, in step 306, the SSPs 2, 4 and 6 are operated to receive calls. Operation proceeds from step 306 to step 308 when a call is received by an SSP 2, 4, or 6. In step 308, a determination is made at the SSP receiving the call as to whether or not an AIN terminating attempt trigger (TAT) was set on the called line. If no TAT was set on the called line, operation proceeds to step 310 wherein the call is completed with SCP involvement.

However, if a TAT was set on the called line, e.g., because the line corresponds to a call routing service subscriber, operation proceeds to step 312. For purposes of explanation, it will be assumed that a call was directed to the first Centrex service subscriber located at CP1 22 and that SSP 2 received the call.

In step 312, in response to activation of the TAT at SSP 2, a query, e.g., request for call processing instructions, is launched to the SCP 69 for call processing instructions. The query includes the telephone number of the called party, e.g., the telephone number of the first service subscriber. In response to the query, the SCP opens the CPR 73 corresponding to the called party using the received called party telephone number to identify the correct CPR and generates an incoming call message to be sent to the network server 35. The incoming call message includes, e.g., calling party ID information such as the calling party telephone number, the called party telephone number and the original called party telephone number. In cases where calls have been forwarded to a different telephone number than the original telephone number which was called, the called party number will differ from the original called party number. In cases where a received call has not been forwarded, the original calling number and calling number will be the same. After generation of the incoming call message, in step 316 the SCP 64 transmits the message to the network server 35 via network interface 45 and OSN 34.

As discussed above, the network server 35 performs various call routing including automated call distribution, operations. As part of the routing operation the server 35 is responsible for determining the actual telephone number to which an incoming call should be directed. Destination number selection information 227 and/or subscriber information 222 is accessed in order to determine the telephone number to which the incoming call should be routed. Destination number selection information 222 includes criteria for selecting the service representative or service subscriber to whom a call should be directed and, in the event of unavailability, redirected.

Destination selection criteria may include the type of call to be serviced, calling party number, operator availability, and a host of other criteria which are known in the art for selecting a party to service a call. Input from the calling party in the form of responses to one or more questions can be used in making a routing decision. For example, a user's selection from a menu of call routing options can be used in the selection of the destination number.

In step 318, the network server 35 makes a determination as to whether or not additional information, e.g., calling party responses to menu selections, is required for call routing purposes. This determination may be based on the called party number and the specific call distribution process associated with that number that the network server 35 is programmed to implement.

If in step 318 the network server 35 determines that additional information from the calling party is required for call routing purposes, operation proceeds to step 320 wherein the server 35 sends a message to the SCP 64 requesting that the caller be played a specific message and that information, e.g., a menu selection, be collected from the caller.

In response to the request to collect information message from the server 35, the SCP 64 selects, in step 322, an IP 10, 20 to be used to play the requested message to the caller and to collect information form the caller. Then in step 324, the SCP 64 sends a send to outside resource (STOR) message to the SSP 2 wherein the incoming call is being held. The message identifies the IP to which the call is to be directed. For purposes of explanation, it will be assumed that IP 10 is selected by the SCP 64 to service the incoming call.

In response to the STOR message, the SSP 2, in step 326 couples the incoming call to the specified IP 10. Then, in step 328 the IP plays the calling party the message specified by the network server 35. Next, in step 330 the IP 10 received input, e.g., DTMF or voice input, from the calling party. Following receipt of information from the calling party, the IP 10 sends a message including the received information to the SCP 64. Then, in step 334, the SCP 64 forwards the information obtained from the calling party to the network server 35, e.g., via OSN 34. From step 334, operation proceeds to step 336.

In step 318, if the server determined that no input from the calling party was required to route the call, operation would have proceeded directly to step 336.

In step 336, the network server uses the information from the received incoming call message and/or additional information collected from the calling party to select a subscriber, e.g., telephone operator or sales representative to service the call. For purposes of explanation, the party selected to receive the call will be referred to as the called party (CP).

Once the CP has been selected by the network server 35, in step 338 the server contacts, via LAN 33 or Internet 30, the CP's computer 36 or 37 to determine if the CP is available, e.g., logged in and not engaged in an active telephone call, to service the incoming call. In one embodiment the network server does this by initiating a check to determine if the user's TAPI interface is enabled, indicating that the CP is logged in to service a call, and by using the CP's TAPI interface to determine whether the CP's telephone line is busy. If the TAPI interface is active and the CP's telephone line is not busy, it is assumed that the CP is available to service incoming calls.

Using the network server to determine CP availability to service a call can be more reliable than simply checking using SSP's whether a CP's telephone line is busy. In many cases, a CP's telephone line may not be busy but the CP may not be available to service a call, e.g., because the CP is out to lunch, not on duty or for various other reasons. Thus, it should be apparent that status information available from a CP's computer, e.g., whether it is active, the user is logged in, TAPI enabled, etc., combined with whether or not the CP's phone line is busy provides a better indicator regarding CP availability than telephone line status alone.

In step 340, the CP's computer 36, 37 returns, via LAN 33 or Internet 30, the telephone line and/or computer status information to the network server 35. Then in step 342, the server determines CP availability by determining from the information received from the CP's computer whether the CP's telephone line is busy.

If the CP's computer indicated that the CP's telephone line was not busy, operation proceeds to two paths which both end at step 352. The two paths beginning with steps 344 and 346 may be performed in parallel, as shown in FIG. 3 or sequentially.

In the first processing path, in step 344, the network server 35 transmits call related data to the CP's computer 36, 37. The data may include automatic number identification (ANI) information, call type information, sales data relevant to serving calls received at the particular called number, pre-existing customer data such as previous purchase information, address information, etc., which was retrieved based on ANI information or information entered by the calling party in response to one or more prompts. The information supplied to the CP's computer 36, 37 in step 344 may be obtained from network data storage 31, the PSTN 90 or from any other source of data accessible by network server 35. Once the CP's computer 36, 37 is supplied with the data intended to facilitate servicing of the call, processing proceeds to step 352.

In step 346, the first step in the second processing path leading to step 352, the network server 35 sends the SCP 64 the telephone number of the CP as the called party number to be used in completing the call. Then, in step 348 the SCP sends a message to the SSP instructing it to complete the called party number received from the network server 35. Then, in step 350 the SSP 2 responds to the message from the SCP 64 by completing the call to the called party telephone number received from the SCP 64. Operation proceeds from step 350 to step 352 wherein the CP responds to and services the incoming call, e.g., using the information displayed on his/her computer system 36, 37. In step 352 call servicing is allowed to terminate in the normal manner, e.g., by one of the parties hanging up.

If in step 342, it was determined that the CP selected to service the call was unavailable, operation proceeds to step 353. In step 353 a determination is made as to whether the CP's telephone line was busy indicating that the CP is logged into the computer 36, 37 but is busy servicing another call. If in step 353 it is determined that the CP's phone line is not busy, indicating that the CP is not available for a reason other than being on the phone, operation proceeds to step 388 via connecting node 355. As will be discussed further below, in step 388 another CP is selected by the server 35 to service the incoming call.

However, if in step 353 it is determined that the CP's phone line is busy, indicating that the reason the CP is unavailable to service the incoming call is because he/she is servicing another call, operation proceeds via connecting node 354 to step 356.

In step 356, the network server 35, via messages and/or control signals sent over LAN 33 or Internet 30, causes the CP's computer 36, 37 to display a message indicating that there is an incoming call, providing calling party information, and presenting the CP with call disposition options including 1) take the call; 2) forward the call to voice mail; 3) route the call to a telephone number supplied by the CP, e.g., via his computer; and 4) reassign the call.

The CP enters the selected call disposition option into the computer 36, 37 via, e.g., a keyboard attached thereto. If the CP selects to route the call to a CP specified number, the CP's response will include the telephone number to which the call is to be routed.

In step 358, the server receives the call disposition information entered by the CP from the CP's computer 36, 37. Server operation proceeds from step 358 depending on the call disposition selected by the CP.

If the CP selected to accept the incoming call, operation proceeds from step 358 to step 360 wherein the network server 35 sets the called party telephone number to the CP's telephone number. Then operation proceeds to steps 362 and 364. Steps 362 and 364 represent the start of two parallel processing paths that both terminate at step 374. While the paths are shown in parallel they may be performed sequentially if desired.

In step 362, the network server 35 supplies call related data to the CP's computer 36, 37 in a manner that is the same as, or similar to, that described previously in regard to step 344. Operation proceeds from step 362 to step 374 wherein the CP services the incoming call using, e.g., the information supplied to the computer 36, 37. Operation proceeds from step 374 to step 384 wherein the call is terminated in the normal manner, e.g., in response to one of the parties hanging up.

In step 364 the network server 35 sends the SCP 64 the CP number as the called party number. In response to receiving the called party number to be used with the incoming call the SCP 64, in step 366, sends a message to the SSP instructing it to complete the incoming call to the called party number provided by the network server 35. Then, in step 368 the SSP signals to the CP that there is an incoming call, e.g., in the manner used to notify call waiting service subscribers of an incoming call while they are on the line with another call.

In step 370 the CP initiates a hook flash by temporarily depressing the switch on the telephone or by activating an icon on the computer 36, 37 to signal to the SSP 2 to put the existing call on hold and to connect the incoming call. In step 372, in response to the signal from the CP, the SSP 2 puts the existing call on hold and provides the incoming call to the CP. Operation then proceeds to step 374 wherein the CP services the incoming call using, e.g., the information supplied to the computer 36, 37. Operation proceeds from step 374 to step 384 wherein the call is terminated in the normal manner, e.g., in response to one of the parties hanging up.

If the CP selected to forward the incoming call to voice mail in response to the presented disposition options, operation would proceed from step 358 along the second call disposition path to step 376. In step 376, the network server 35 sets the called party telephone number to the CP's voice mail telephone number. Then, in step 378 the network server 35 sends the SCP 64 the voice mail number as the called party number.

In response to receiving the called party number from the network server 35, the SCP 64 sends a message to the SSP 2 causing the SSP 2 to complete the incoming call to the called party number received from the network server 35, i.e., the CP's voice mail number.

In step 382, in response to the signal from the SCP 64, the SSP 2 connects the incoming call to the CP's voice mail system and then in step 384 the call is terminated in the normal manner.

If the CP selected the third call disposition option presented in step 356, i.e., to have the call routed to a CP supplied telephone number, operation would proceed from step 358 along the third processing path to step 386. In step 386, the server sets the telephone number to be used as the CP telephone number to the telephone number supplied by the CP. Operation then proceeds to step 338 via connecting node 390. Call processing will go forward using the CP supplied number as the CP number with ultimate call completion depending on the availability of the party corresponding to the new CP telephone number.

If the CP selected the fourth call disposition option presented in step 356, i.e., to have the network server 35 reassign the call, operation would proceed from step 358 along the fourth processing path to step 388. In step 388, the network server 35 selects a different party to service the call, e.g., a backup operator or the next best qualified service representative, and sets the CP telephone number to the additional party's telephone number. Operation then proceeds to step 338 via connecting node 390. As in the case of the CP supplied telephone number, call processing will go forward using the new CP number with ultimate call completion depending on the availability of the party corresponding to the new CP telephone number.

The method shown in FIG. 3 addresses the assignment, e.g., distribution of calls, and the provision of relevant data to the computer system of the party assigned to service an incoming call.

Figure 4:
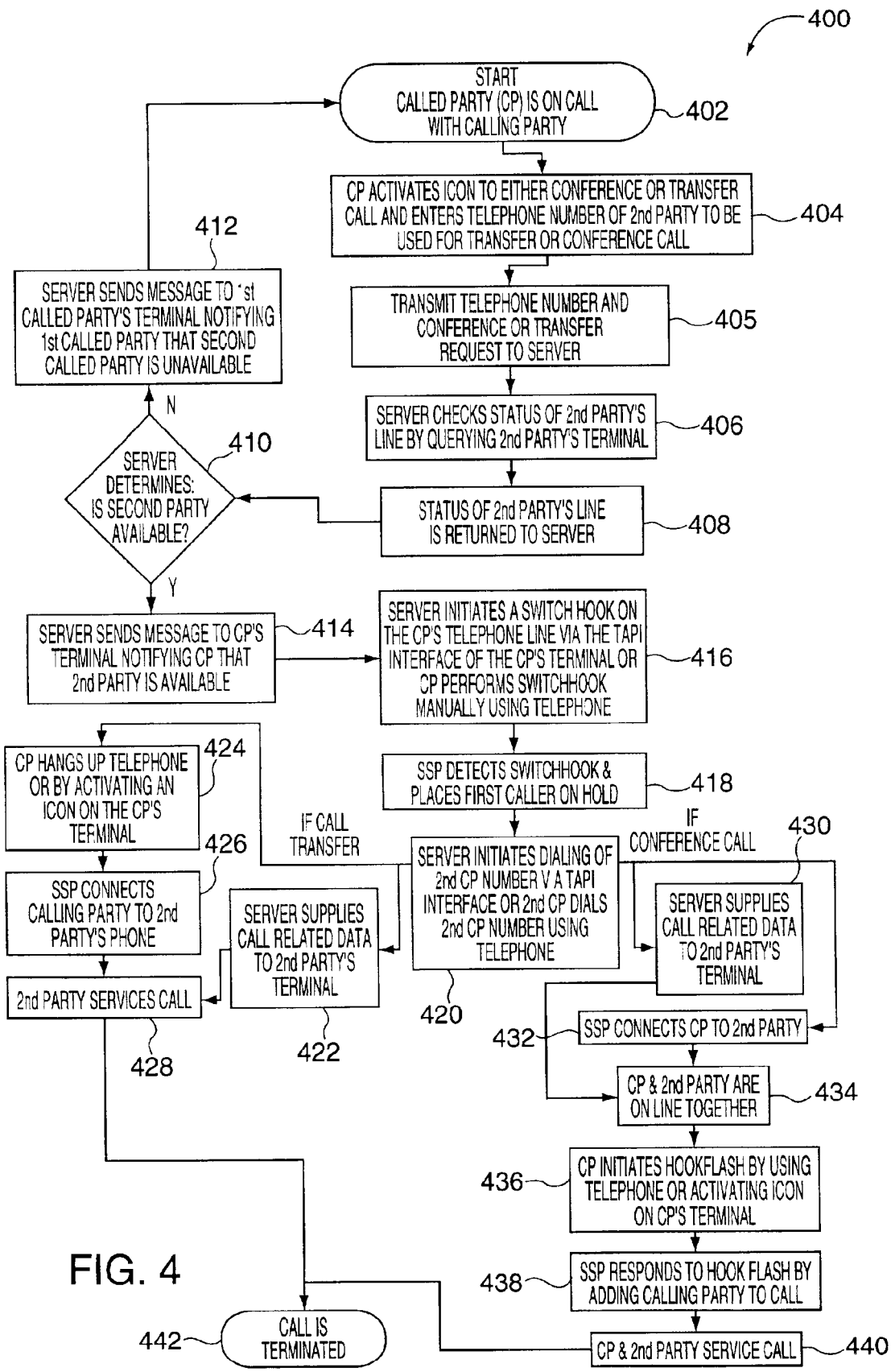
FIG. 4 illustrates a first exemplary call transfer/conferencing method of the present invention.
Figure 5:
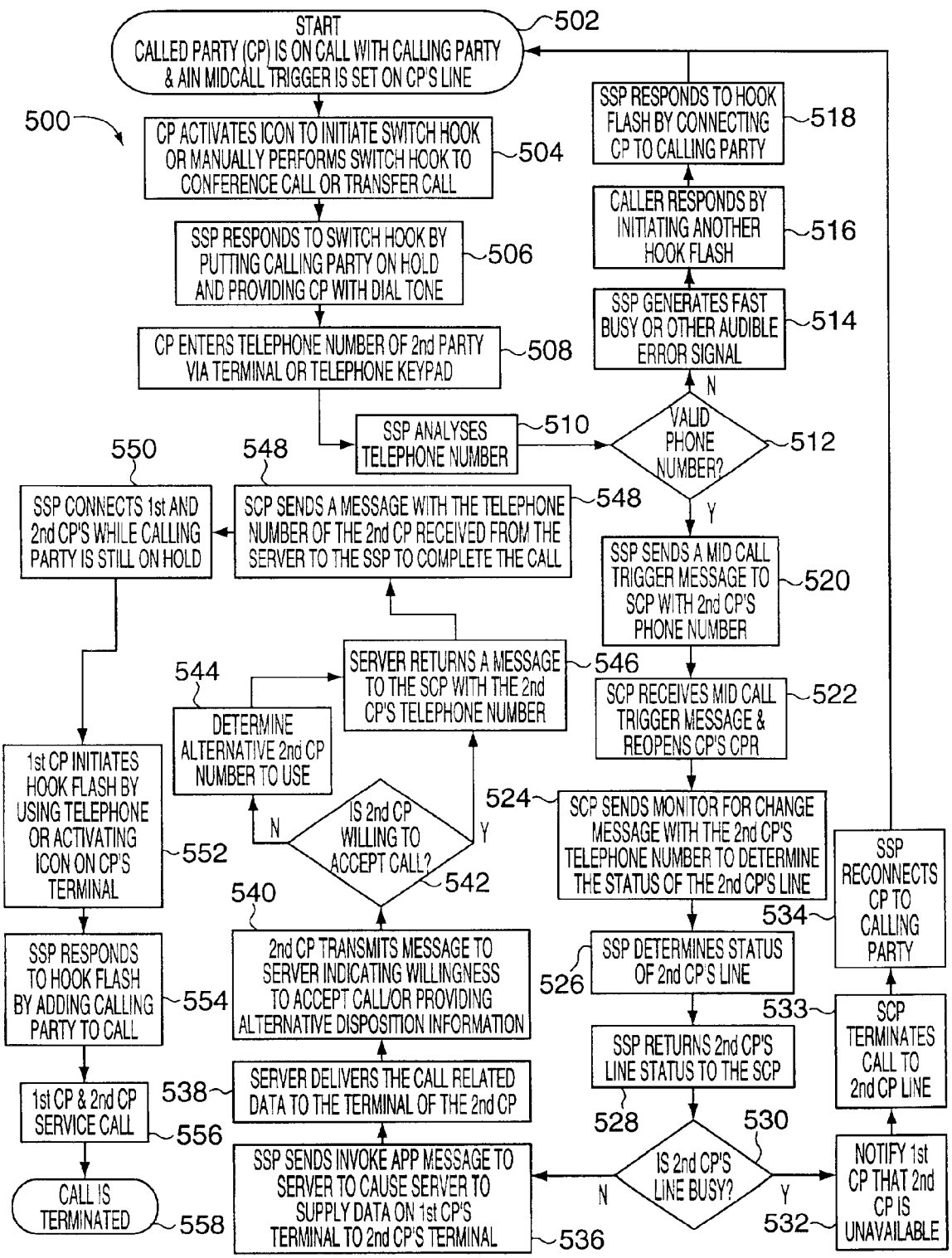
FIG. 5 illustrates another exemplary call transfer/conferencing method of the present invention.

As part of the process of servicing a call, a first called party (CP) may wish to transfer the call to another party, e.g., a $2^{nd}$ party or to conference in a $2^{nd}$ party. From an efficiency and service standpoint, it is often desirable that the $2^{nd}$ party have access to the service information provided to the CP's computer and/or to information entered by the CP into the computer system while servicing the call being transferred or conferenced. FIGS. 4 and 5 illustrate alternative techniques for performing call transfer and conferencing operations in accordance with the present invention while supplying call related data to the computer system of the party to which the call is being transferred or who is being conferenced in on the existing call.

In the FIG. 4 example, a party's computer system and TAPI interface included therein, is used to determine the party's availability to accept a call or to join in an existing call. In the FIG. 5 example, AIN mid-call trigger functionality is used to determine whether a party's telephone line is busy and to initiate call transfer or conferencing in the case where the party's line is not busy.

The call transfer/conferencing method 400 illustrated in FIG. 4 begins in step 402 with a called party (CP) with a calling party. Operation proceeds from step 402 to step 404 wherein the CP initiates a call transfer or conference operation, e.g., by activating one of a corresponding call transfer or call conference icon displayed on the CP's computer screen and entering a telephone number of party ($2^{nd}$ party) to be added to the call or to whom the call is to be transferred. In step 405, the CP's computer system 36 transmits the telephone number and conference or transfer request to the network server 35.

The network server 35, in step 406, responds to the transfer or conference request by checking the status of the $2^{nd}$ party's computer and telephone line by querying the $2^{nd}$ party's computer 37. The $2^{nd}$ party's computer system is identified by the network server 35 from the subscriber telephone number, e.g., by accessing computer IP address information stored in the SCP's set of customer data 71.

In step 408, assuming the 2nd party's computer is on and the $2^{nd}$ party is logged in to receive calls, the status of the $2^{nd}$ party's line is returned by the party's computer 37 to the network server 35, e.g., via the Internet 30 or business LAN 33. Alternatively, the time period for receiving status information times out and operation proceeds from step 406, to step 410. Failure for the $2^{nd}$ subscriber's line status to be returned in a preselected amount of time is interpreted as indicating the second subscriber is unavailable.

In step 410, the server 35 determines the availability of the $2^{nd}$ patty to receive or join the ongoing call. If it is determined in step 410 that the $2^{nd}$ party is unavailable, operation proceeds to step 412. In step 412 the server sends a message to the CP's computer 36 notifying the CP that the $2^{nd}$ party is unavailable. Operation then returns to state 402 wherein the CP is on the call with the calling party.

If in step 410 the network server 35 determines that the $2^{nd}$ party is available to take the call, operation proceeds to step 414 wherein the server 35 sends a message to the CP's computer 36 notifying the CP that the $2^{nd}$ party is available. Then in step 416 the network server 35 initiates a switch hook on the CP's telephone line via the TAPI interface on the CP's computer 36 or, alternatively, in response to the notification of the $2^{nd}$ party's availability, the CP manually performs a switch hook operation by briefly depressing and releasing the switch hook on the CP's telephone 38.

In step 418 the SSP detects the hook flash resulting from the switch hook operation and responds by placing the first caller on hold. Then, in step 420, the network server 35 initiates dialing of the $2^{nd}$ CP from the CP's phone 38 via TAPI or, alternatively, the CP manually dials the $2^{nd}$ party's telephone number. Operation proceeds along separate paths from step 420 depending on whether a call transfer operation is to be performed or a conference call is being initiated.

If a call transfer operation is being performed, operation proceeds from step 420 along two paths to step 428. The first path begins with step 424 wherein the CP manually hangs up the telephone 38, or the network server 35, via TAPI, controls the computer system 37 to hang up the telephone 38. Operation then proceeds to step 426 wherein the SSP connects the calling party to the $2^{nd}$ party's telephone 39. From step 426, operation proceeds to step 428.

In step 422, which forms the second processing path from step 420 to step 428, the network server supplies call related data, e.g., data previously supplied to the CP's computer 36 or data entered by the CP, to the $2^{nd}$ party's computer 37. Operation then proceeds to step 428. In step 428 the $2^{nd}$ party services the call before the call is terminated in step 442.

As a result of being automatically supplied with call related data prior to or while servicing the $2^{nd}$ call, the $2^{nd}$ party is able to service the call more efficiently than might otherwise be possible.

If the CP initiates a conference call, as opposed to transferring a call, operation proceeds along two parallel paths starting with steps 430 and 432. In step 430, the network server 35 supplies call related data to the $2^{nd}$ party's computer 37. Operation proceeds from step 430 to step 434.

In step 432, the SSP 2 connects the CP to the $2^{nd}$ party before operation proceeds to step 434. In step 434, the CP & $2^{nd}$ party are on the line together at which point they can talk about the call to be processed while both having the call related data available to them via their computers. Then, in step 436 the CP initiates a hook flash by briefly depressing the switch hook on the telephone 38 or by activating an icon on the CP's computer terminal 36 causing the computer to perform a hook flash operation via TAPI.

In response to the hook flash in step 438, the SSP 2 adds the calling party to the existing call between the CP and $2^{nd}$ party. Then in step 440 the CP and $2^{nd}$ party service the call before the call is terminated in step 442.

FIG. 5 illustrates a call transfer/conferencing method 500 which relies on AIN functionality and the use of mid-call triggers to determine the status of parties to whom a call may be transferred or added to an existing call.

The method begins in step 502 with a called party (CP) being on call with a calling party. For purposes of explanation it will be assumed that the CP corresponds to telephone 38 and that as part of the Centrex service to which the CP subscribes, a mid-call trigger has been set on the subscriber's line. In step 504 the CP briefly depresses the switch hook causing a hook flash which is detected by the SSP 2 to which the telephone 38 is coupled. In step 506, the SSP 2 responds to the hook flash by putting the calling party on hold and providing the CP with dial tone. Next in step 508, the CP responds to the dial tone by entering the telephone number of the $2^{nd}$ party, e.g., the party to be added to the call or to whom the call is to be transferred. In step 508, the telephone number can be entered by the keypad of telephone 38 or via computer 36 and the supported TAPI.

In step 510, the SSP 2 responds to the entered telephone number by analyzing to check that it is a valid telephone number. Then in step 512 a determination is made as to whether or not the entered telephone number is a valid telephone number.

If the telephone number entered by the CP is not valid, operation proceeds to step 514 wherein the SSP 2 generates a fast busy or other audible error signal which is supplied to the CP. In step 516 the CP responds to the error signal by initiating another hook flash which causes the SSP 2, in step 518, to reconnect the CP to the calling party. This returns the CP to the state in step 502 of being on the call with the calling party and allows the CP to initiate a new call transfer or conferencing operation.

If the telephone number entered by the CP is determined to be valid, operation proceeds from step 512 to step 520 wherein the SSP 2 sends a mid-call trigger message to the SCP 64 with the $2^{nd}$ party's telephone number. Then, in step 522, the SCP 64 reopens the CP's CPR in response to receiving the mid-call trigger message. Next, in step 524, the SCP 64 sends a monitor for change message to the SSP 2 with the $2^{nd}$ party's telephone number to determine the status of the $2^{nd}$ party's line.

In response to the monitor for change message, in step 526, the SSP 2 determines using SS7 functionality, the status of the $2^{nd}$ party's line. Then, in step 528, the SSP returns the $2^{nd}$ party's lines status to the SCP 64.

In step 530, the SCP 64 determines from the returned information if the $2^{nd}$ party's line is busy. If the $2^{nd}$ party's line is busy, operation proceeds to step 532. In step 532, the SCP controls an IP, e.g., using a STOR message sent to SSP 2, to notify the CP that the $2^{nd}$ party is unavailable. Then in step 533 the SCP 64 terminates the call to the $2^{nd}$ CP line. Following termination of the call to the $2^{nd}$ CP line, in step 534 the SSP 2 reconnects the CP to the calling party causing the state of the call to return to the state found in step 502 wherein the called party (CP) and calling party are both on the line together.

In step 530, if the SCP 64 determines that the $2^{nd}$ party's line is not busy, operation proceeds to step 536. In step 536, the SCP 64 sends an invoke app message to the network server 35 causing the server to invoke an application which causes call related data from the first CP's computer 36 or call related data previously supplied to the computer 36, to be supplied to the $2^{nd}$ party's computer 37.

In step 538 the network server delivers the call related data to the $2^{nd}$ party's computer 37 and requests that the $2^{nd}$ party indicate via the computer 377 whether or not they are willing to accept the call. In reply, in step 540, the $2^{nd}$ party's computer transmits to the network server 35 information provided by the $2^{nd}$ party indicating whether or not they are willing to accept the call. In step 542, the network server determines from the received information if the $2^{nd}$ party is willing to accept the call.

If the $2^{nd}$ party is not willing to accept the call, operation proceeds to step 544 wherein the network server 35 determines an alternative $2^{nd}$ party telephone number to use. This may involve identifying a backup party to the initial $2^{nd}$ party or another available individual with a similar set of skills as the $2^{nd}$ party. A telephone number corresponding to the alternative $2^{nd}$ party is provided as part of step 544, to the network server 35 to be used as the $2^{nd}$ party number.

If in step 542 the server determines that the $2^{nd}$ party is willing to accept the call, operation proceeds directly to step 546.

In step 546 the network server 35 returns a message to the SCP 64 with the $2^{nd}$ party's telephone number. Then in step 548 the SCP 64 sends a message, e.g., an Analyze_Route message, with the telephone number of the $2^{nd}$ party received from the network server 35 to the SSP 2 to complete the call.

In response to the message from the SCP 64, in step 550 the SSP 2 connects the CP with the $2^{nd}$ party while the calling party is still on hold. Once connected, the CP and $2^{nd}$ party are free to discuss the call being serviced without the calling party on the line.

After being connected to the $2^{nd}$ party, in step 552 the CP initiates a hook flash using the telephone switch hook or by activating an icon on his computer 36. In step 554 the SSP responds to the hook flash by adding the calling party to the call with the CP and the $2^{nd}$ party. If the CP wished to transfer the call, he could hang up at that point. However, the flow in FIG. 5 assumes that both the CP and $2^{nd}$ party will service the call as per step 556. Following servicing of the call in step 556, the call is terminated in step 558, e.g., in response to the calling party or CP and $2^{nd}$ party hanging up.

Numerous variations on the above described methods and apparatus are possible without departing from the scope of the invention.

What is claimed is:

1. A call processing method utilizing a telephone network, comprising the steps of:
   operating a telephone switch to detect receipt of an incoming telephone call on a subscriber telephone line;
   in response to detecting an incoming telephone call on the subscriber telephone line, operating the telephone switch to transmit a message to a service control point indicating receipt of a call on the subscriber telephone line;
   operating the service control point to transmit a message to a first computer in response to the message transmitted by said telephone switch; and
   operating the first computer to select a first party to service the incoming call, wherein the first computer is a network server serving the telephone network without being dedicated to solely serving any party placing or receiving a telephone call over the telephone network.

2. The method of claim 1, further comprising:
   operating the first computer to determine the availability of the first party to service the incoming call by contacting a second computer, the second computer being associated with the first party.

3. The method of claim 2, wherein the second computer is coupled to a first telephone device by a communications link which supports computer and telephone interaction, the step of operating the first computer to determine the availability of the first party including:
   obtaining telephone device status information from the second computer.

4. The method of claim 3, further comprising:
   operating the first computer to send call related information to the second computer.

5. The method of claim 4, further comprising:
   operating the first computer to send a first telephone number corresponding to the first telephone device to the service control point; and
   operating the service control point to instruct the telephone switch to complete the incoming call using the first telephone number as the destination telephone number.

6. The method of claim 5, wherein the first telephone number is different from a telephone number used to route the incoming call to said subscriber telephone line.

7. The method of claim 1, further comprising:
   operating the first computer to determine from a second computer if a telephone line associated with the first party is busy.

8. The method of claim 7, wherein determining from the second computer if the telephone line is busy includes using a telephone application programming interface to obtain telephone line status information.

9. The method of claim 7, further comprising:
   in response to detecting that said telephone line is busy:
   controlling the second computer to display a plurality of call disposition options; and operating the first computer to receive call disposition selection information from the second computer.

10. The method of claim 9, wherein the received call disposition information includes a telephone number to which the incoming call should be completed, the method further comprising the step of:

transmitting the received telephone number to the service control point.

11. The method of claim 10, further comprising:

operating the service control point to transmit the received telephone number to the telephone switch; and operating the telephone switch to complete the call to the telephone line corresponding to the received telephone number.

12. The method of claim 11, the method further comprising:

transmitting call related data to a third computer, the third computer being associated with a party to whom the received telephone number corresponds.

13. The method of claim 9, wherein the received call disposition information includes a telephone number, the method further comprising:

operating the first computer to use the received telephone number to identify a third computer; and transmitting to the third computer call related data.

14. The method of claim 13, further comprising:

transmitting the received telephone number to the service control point;

operating the service control point to transmit the received telephone number to the telephone switch; and operating the telephone switch to complete the call to the telephone line corresponding to the received telephone number.

15. A communications system comprising:

a telephone switch including trigger circuitry for detecting calls to a first telephone line on which a trigger is set, a first telephone number being associated with the first telephone line;

a first subscriber telephone device coupled to the telephone switch by the first telephone line;

a first computer coupled to the first subscriber telephone device by a communications link which supports the transmission of TAPI signals between the first computer and the first subscriber telephone device; and a second computer coupled to the telephone switch and to the first computer, the second computer including a routine for determining, as a function of telephone line status information obtained from the first computer, a telephone number to be used to complete the routing of calls to the first telephone line which are detected by said trigger circuitry.

16. The system of claim 15, further comprising:

a service control point for coupling the telephone switch to the second computer.

17. The system of claim 15, where said trigger circuitry is terminating attempt trigger circuitry.

18. The system of claim 17, further comprising:

a first Internet Protocol based computer network for coupling the first computer to the second computer.

19. The system of claim 18, further comprising:

a second Internet Protocol based computer network for coupling the second computer to the service control point; and wherein the second computer system includes a routine for controlling the transmission of call related data to the first computer over said first Internet Protocol based computer network.

20. The system of claim 19, further comprising;

a signaling system seven communications link for coupling the service control point to said telephone switch.

21. A communications method utilizing a telephone network, comprising:

triggering, in response to an incoming call, a terminating attempt trigger set on a first telephone service subscriber line corresponding to a service subscriber telephone number;

contacting a service control point for call processing instructions in response to triggering of the terminating attempt trigger;

operating the service control point to transmit a message including the service subscriber telephone number to a first computer;

operating the first computer to select a party to service said incoming call, wherein the first computer is a network server serving the telephone network without being dedicated to solely serving any party placing or receiving a telephone call over the telephone network;

operating the first computer to contact a second computer to determine the status of a telephone line coupled to the second computer; and performing a call routing operation as a function of the determined status of the telephone line coupled to the second computer.

22. The method of claim 21, wherein performing a call routing operation includes:

operating the first computer to supply a telephone number to a service control point; and routing an incoming call to a telephone line identified by said telephone number.

23. The method of claim 22, wherein routing an incoming call includes:

operating the service control point to send a message to a telephone switch to route the incoming call using said telephone number.

24. The method of claim 23, wherein the step of operating the first computer to supply a telephone number to a service control point includes:

selecting as said telephone number to be supplied to the service control point, a telephone number corresponding to the party selected to service said incoming call.

* * * * *